(No Model.)　　　　　　　　　　　　　　　　　　2 Sheets—Sheet 1.
J. P. EASTMAN.
DISK ENGINE.

No. 425,213.　　　　　　　　　　　　Patented Apr. 8, 1890.

Witnesses:　　　　　　　　　　　　　　　　Inventor:

(No Model.) J. P. EASTMAN. 2 Sheets—Sheet 2.
DISK ENGINE.

No. 425,213. Patented Apr. 8, 1890.

Witnesses:
Harry T. Jones
Albert H. Adams

Inventor:
John P. Eastman

UNITED STATES PATENT OFFICE.

JOHN P. EASTMAN, OF CHICAGO, ILLINOIS.

DISK ENGINE.

SPECIFICATION forming part of Letters Patent No. 425,213, dated April 8, 1890.

Application filed November 5, 1889. Serial No. 329,376. (No model.)

*To all whom it may concern:*

Be it known that I, JOHN P. EASTMAN, residing at Chicago, in the county of Cook and State of Illinois, and a citizen of the United States, have invented a new and useful Improvement in Disk Engines, of which the following is a specification, reference being had to the accompanying drawings, in which—

Figure 1:
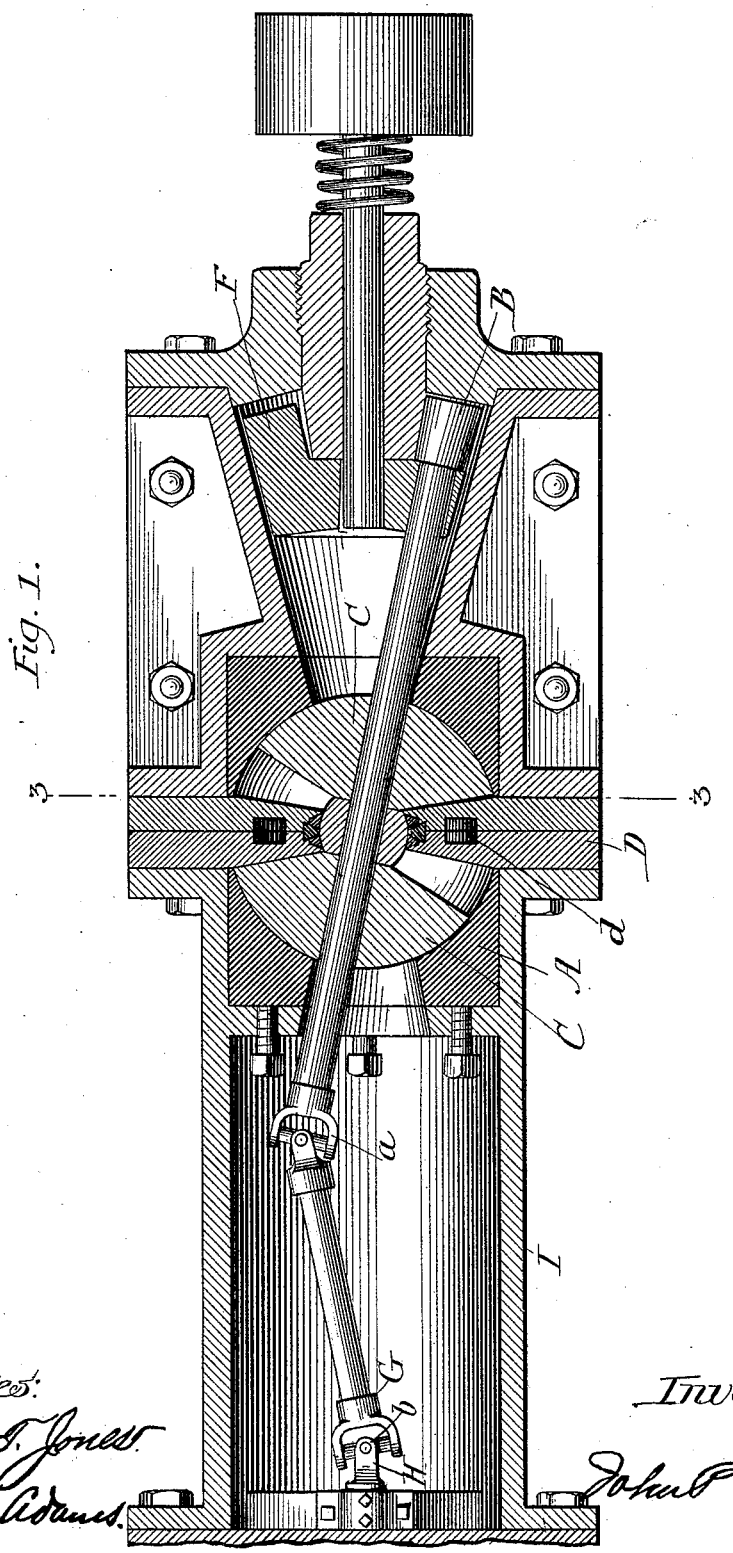
Figure 2:
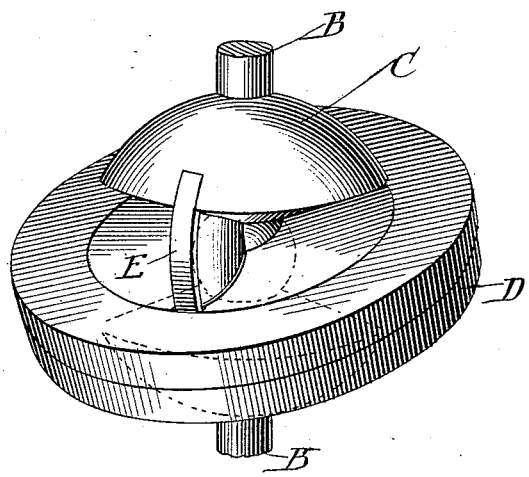
Figure 3:
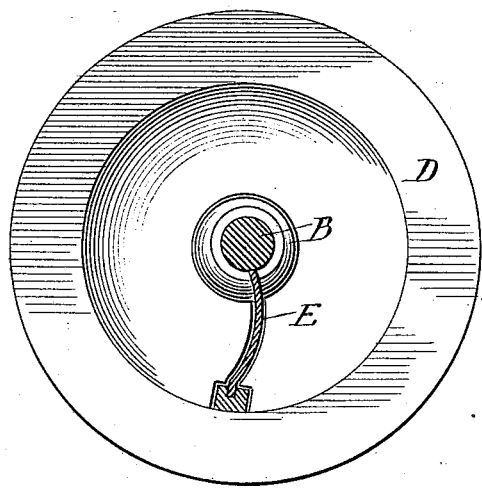

Figure 1 is a longitudinal section. Fig. 2 is a side elevation of the spherical sectors and dividing-plate. Fig. 3 is a cross-section at line 3 3 of Fig. 1.

This invention relates to that class of steam-engines known as "disk engines," in which a shaft is revolved or gyrated in a conical orbit without rotation on its longitudinal axis by the pressure of steam on the face of a disk or disks.

As heretofore constructed trouble has been experienced in the breaking or rapid wearing of the abutment or steam cut-off which divides the disk or disks, as shown in Figs. 2 and 3, which arises from the tendency of the disks and shaft to rotate or rock on the longitudinal axis of the shaft.

The object of this invention is to provide means for preventing any rocking or twisting of the revolving or gyrating shaft, thereby obviating the difficulty above mentioned, which I accomplish as hereinafter described. That which I claim as new will be pointed out in the claims.

In the drawings, A represents a suitable steam-cylinder having a spherical chamber. This cylinder may be made in any suitable form of construction.

B is a revolving shaft, which, as shown, extends through suitable openings in the steam-cylinder A.

C C are two spherical sectors secured on a shaft B and located in the spherical chamber of the steam-cylinder.

D is the dividing-plate, fixed in the cylinder A.

d is the steam-passage in the dividing-plate D.

E is the steam cut-off or abutment.

F is a wheel, to which the shaft D is connected in such manner that as the shaft revolves or gyrates in its conical orbit it communicates a rotary movement to the wheel F.

The parts above briefly described form no part of my invention, and may be varied or changed as desired.

My invention, which I will hereinafter describe, is designed to be applied to any form of disk engine whose shaft revolves or gyrates in a conical orbit without rotation on its longitudinal axis, and which employs a steam cut-off or abutment, such as E.

G is a guiding-bar, which is connected to one end of the shaft B by a double joint $a$, and at its opposite end is connected to a fixed block H by a double joint $b$. The double joints $a$ and $b$ permit the bar G to revolve or gyrate in a conical orbit with the shaft B; but the fixed block H does not permit the bar G to rotate or twist, and the bar in turn does not permit the shaft B to rotate or twist on its longitudinal axis, thereby giving the shaft B a guiding-support which allows it to revolve or gyrate freely, but does not allow it to rock or twist on its longitudinal axis.

The block H is adjustably secured in the frame of the engine by set-screws or otherwise, so that it may be adjusted to bring the disk or spherical sectors into proper relation to the abutment or cut-off E.

I have shown an engine employing two spherical sectors on opposite sides of a dividing-plate; but it is evident that my invention can be employed in an engine which has a central disk secured on the shaft and working against one or two conical surfaces, the movement of the shaft being the same in both cases and both employing an abutment or cut-off, as E, and hence the same necessity arises in both to keep the shaft from rocking or twisting.

By the use of a revolving or gyrating support which is non-rotating on its longitudinal axis the disk or spherical sectors are kept in the same constant relation to the abutment or cut-off E while wabbling or passing from side to side in the steam-space of the cylinder, thereby preventing any wear against the cut-off E by the tendency of the disk or spherical sectors to rotate and any liability of breaking the abutment or cut-off E by any unusual twisting or rocking of the shaft B.

I is a casing for the bar G, protecting it from dust and dirt. As shown, it is an extension of the cylinder A.

What I claim as new, and desire to secure by Letters Patent, is—

1. In a disk engine, the combination, with the revolving or gyrating shaft, of a revolving or gyrating and non-rotating support pivotally connected with said shaft, substantially as and for the purpose specified.

2. In a disk engine, the combination of the revolving or gyrating shaft and a bar pivoted thereto by a double joint with a fixed support or block to which the bar is pivoted by a double joint, substantially as and for the purpose specified.

JOHN P. EASTMAN.

Witnesses:
HARRY T. JONES,
ALBERT H. ADAMS.